United States Patent
Hosey et al.

(10) Patent No.: US 9,820,124 B1
(45) Date of Patent: Nov. 14, 2017

(54) SYSTEM AND METHOD OF EMERGENCY CONTACT ACCESS DURING A CRITICAL EVENT

(71) Applicant: GM GLOBAL TECHNOLOGY OPERATIONS LLC, Detroit, MI (US)

(72) Inventors: Eric T. Hosey, Royal Oak, MI (US); Matthew C. Neely, Rochester, MI (US); Russell A. Patenaude, Macomb Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/276,863

(22) Filed: Sep. 27, 2016

(51) Int. Cl.
*H04M 11/04* (2006.01)
*H04W 4/22* (2009.01)
*H04W 4/00* (2009.01)

(52) U.S. Cl.
CPC ............. *H04W 4/22* (2013.01); *H04W 4/008* (2013.01)

(58) Field of Classification Search
CPC ............................... H04W 4/22; H04W 4/008
See application file for complete search history.

(56) References Cited

U.S. PATENT DOCUMENTS

| | | | | |
|---|---|---|---|---|
| 8,903,351 | B2* | 12/2014 | Berry | H04M 1/6091 455/404.1 |
| 2008/0188198 | A1* | 8/2008 | Patel | G06F 21/6245 455/404.2 |
| 2009/0168974 | A1* | 7/2009 | McCormick | H04M 11/04 379/45 |
| 2011/0320066 | A1* | 12/2011 | Schofield | B60R 1/12 701/1 |
| 2012/0215534 | A1* | 8/2012 | Hatton | G08G 1/205 704/235 |
| 2015/0229604 | A1* | 8/2015 | Pal | H04L 61/2007 370/254 |
| 2017/0156045 | A1* | 6/2017 | Balabhadruni | H04L 65/1016 |

* cited by examiner

*Primary Examiner* — Kashif Siddiqui

(57) ABSTRACT

A system to access an emergency contact during a critical event is presented herein. The system includes a memory, controller, display, and sensor. The memory includes one or more executable instructions. The controller is configured to read and execute the executable instructions. The display is configured to exhibit information. The sensor the configured to send at least one critical event signal. Moreover, the executable instructions enable the controller to: receive an emergency contact; store the emergency contact in the memory; receive (from the sensor) a critical event signal; determine the status of a critical event; transmit the emergency contact from the memory to the display; and command the display to exhibit the emergency contact.

8 Claims, 3 Drawing Sheets

SYSTEM AND METHOD OF EMERGENCY CONTACT ACCESS DURING A CRITICAL EVENT

Vehicles may include telematics systems that may have the capability of communicating using short-range wireless communications (SRWC). In addition, many modern cellular telephones include features and software applications beyond mere telephony such as the ability to utilize SRWC. Cellular telephones may moreover establish SRWC with the telematics systems and the thematic systems may subsequently obtain certain data stored in the cellular telephone. In certain instances, such as when the vehicle encounters a critical event or in preparation thereof, emergency contact information stored in cellular telephones may be transmitted to the telematics systems through the established SRWC and then sent to a backend live advisor, exhibited on the telematics display, or exhibited on the cellular telephone display. In other instances, the telematics systems and/or cellular telephones may receive the emergency contact information from a remote third party database, to allow such information to be exhibited or sent to the live advisor. Such services thus allow live advisors and first responders to easily connect with the emergency contact, for example, when the cellular phone is locked or lost and the vehicle operator is unconscious, previously transported from the scene, or has somehow lost the ability to speak.

SUMMARY

A method to access an emergency contact during a critical event is presented herein. The method includes: receiving (at a controller) an emergency contact; storing (via the controller) the emergency contact in a memory; receiving (via the controller) a critical event signal from a sensor; determining (via the controller) if a vehicle has experienced a critical event based on the signal; based on the previous determination, transmitting (via the controller) the emergency contact from the memory to a live advisor.

The controller and memory may be located in a mobile computing device and thus the emergency contact may be received (at the controller) via a user interface. The controller and memory may be located in a vehicle telematics unit and thus the emergency contact may be transmitted from the memory to the live advisor (by the controller) via a wireless carrier system. The emergency contact may be received (by the controller) from a mobile computing device via at least one short range wireless communication (SRWC) data transmission. The controller and memory may be located in a data center and thus the emergency contact may be transmitted from the memory to the live advisor (by the controller) via a local area network. The sensor may be at least part of a vehicle emergency reaction module (ERM).

Another method to access an emergency contact during a critical event is presented herein. The method includes: receiving (at a controller) an emergency contact; storing (via the controller) the emergency contact in a memory; receiving (via the controller) a critical event signal from a sensor; determining (via the controller) whether a critical event has occurred based on the signal; based on the previous determination, transmitting (via the controller) the emergency contact from the memory to a display; exhibiting (via the display) the emergency contact.

The method may further include: based on the previous determination, transmitting (via the controller) the emergency contact to an audio system; and generating (via the audio system) at least one audio notification associated with the emergency contact. The controller and memory may be located in a mobile computing device and thus the emergency contact may be received (at the controller) via a user interface.

The controller and memory may be located in a vehicle telematics unit and thus the emergency contact may be transmitted from the memory to the display (by the controller) via a communications bus. The emergency contact may be received (by the controller) from a mobile computing device via at least one short range wireless communication (SRWC) data transmission. The controller and memory may be located in a data center and thus the emergency contact may be transmitted from the memory to the display (by the controller) via a wireless carrier system. The sensor may be at least part of a vehicle emergency reaction module (ERM).

A system to access an emergency contact during a critical event is presented herein. The system includes a memory, controller, display, and sensor. The memory includes one or more executable instructions. The controller is configured to read and execute the executable instructions. The display is configured to exhibit information. The sensor the configured to send at least one critical event signal. Moreover, the executable instructions enable the controller to: receive an emergency contact; store the emergency contact in the memory; receive (from the sensor) a critical event signal; determine the status of a critical event; transmit the emergency contact from the memory to the display; and command the display to exhibit the emergency contact.

The system may further include an audio system which is configured to provide audio output within a vehicle cabin area. In this instance, the executable instructions further enable the controller to: transmit the emergency contact from the memory to the audio system; and generate at least one audio notification associated with the emergency contact. The controller and memory may be located in the data center. In this instance, the executable instructions may further enable the controller to transmit the emergency contact from the memory to the display via a wireless carrier system.

The controller and memory may be located in the mobile computing device and thus the emergency contact may be received (at the controller) via a user interface. The controller and memory may be located in a vehicle telematics unit. The emergency contact may be received (by the controller) from a mobile computing device via at least one short range wireless communication (SRWC) data transmission. The sensor may be at least part of a vehicle emergency reaction module (ERM).

BRIEF DESCRIPTION OF THE DRAWINGS

One or more preferred exemplary embodiments of the invention will hereinafter be described in conjunction with the appended drawings, wherein like designations denote like elements, and wherein.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the exemplary aspects of the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The method and system described below pertains to vehicles equipped with modular or embedded wireless telephony for communication over a wireless carrier system, as well as a variety of sensors which can detect various vehicle dynamics such as, but not limited to, whether the vehicle has experience certain events (e.g., critical events and road surface events), whether the vehicle engine is running, etc. Modern mobile computing devices, such as Smart phones and other mobile devices, may also wirelessly communicate via the same wireless carrier system. In addition to wireless telephony capability, both vehicle telematics equipment and mobile computing devices may have the capability to communicate via short-range wireless communication (SRWC) such as, but not limited to, Bluetooth/Bluetooth Low Energy, or Wi-Fi. Thus, in certain circumstances, it may be advantageous to send an instruction from the mobile computing devices to the vehicle telematics unit over a short-range wireless network. Such instructions may include emergency contact information to supplement certain vehicle services such as, but not limited to, emergency services.

Figure 1:
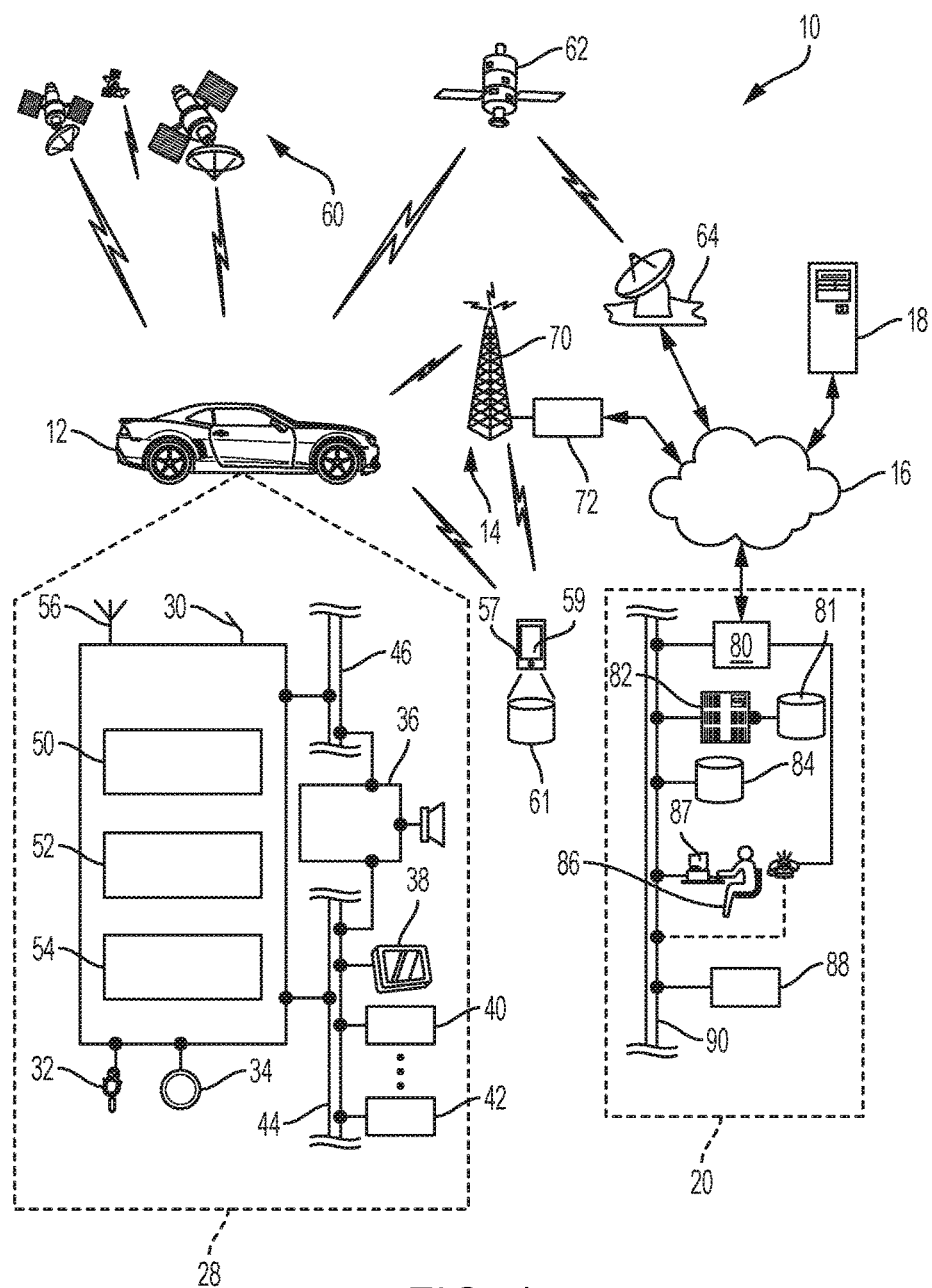
FIG. 1 is a block diagram depicting an exemplary embodiment of a communications system capable of utilizing the method disclosed herein.

With reference to FIG. 1, there is shown an operating environment that includes, among other features, a mobile vehicle communications system 10 and that can be used to implement the method disclosed herein. Communications system 10 generally includes a vehicle 12, one or more wireless carrier systems 14, a land communications network 16, a computer 18, and a data center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including, but not limited to, motorcycles, trucks, sports utility vehicles (SUVs), recreational vehicles (RVs), marine vessels (e.g., boats), aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit 30 such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that is installed in the vehicle and that enables wireless voice and/or data communication over wireless carrier system 14 and via wireless networking. This enables the vehicle to communicate with data center 20, other telematics-enabled vehicles, or some other entity or device. The telematics unit 30 preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor 86 or voice response unit at the data center 20) and data communication (e.g., to provide GPS location data or vehicle diagnostic data to the data center 20), the system can utilize a single call over a voice channel and switch as needed between voice and data transmission over the voice channel, and this can be done using techniques known to those skilled in the art.

According to one embodiment, telematics unit 30 utilizes cellular communication according to standards such as GSM or CDMA and thus includes a standard cellular chipset 50 for voice communications like hands-free calling, a wireless modem for data transmission, an electronic processing device 52, at least one digital memory device 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between vehicle 12 and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

One of the networked devices that can communicate with the telematics unit 30 is a mobile computing device 57, such as a smart phone, personal laptop computer or tablet computer having two-way communication capabilities, a netbook computer, or any suitable combinations thereof. The mobile computing device 57 can include computer processing capability, a transceiver capable of communicating with wireless carrier system 14, a user interface 59, and/or a GPS module capable of receiving GPS satellite signals and generating GPS coordinates based on those signals. User interface 59 may be embodied as a touch-screen graphical interface capable of user interaction as well as displaying information. Examples of the mobile computing device 57 include the iPhone™ manufactured by Apple, Inc. and the Droid™ manufactured by Motorola, Inc. as well as others. While the mobile computing device 57 may include the ability to communicate via cellular communications using the wireless carrier system 14, this is not always the case. For instance, Apple manufactures devices such as the various models of the iPad™ and iPod Touch™ that include the processing capability, interface 59, and the ability to communicate over a short-range wireless communication link. However, the iPod Touch™ and some iPads™ do not have cellular communication capabilities. Even so, these and other similar devices may be used or considered a type of wireless device, such as the mobile computing device 57, for the purposes of the method described herein.

Mobile device 57 may be used inside or outside of vehicle 12, and may be coupled to the vehicle by wire or wirelessly. The mobile device also may be configured to provide services according to a subscription agreement with a third-party facility or wireless/telephone service provider. It should be appreciated that various service providers may utilize the wireless carrier system 14 and that the service provider of the telematics unit 30 may not necessarily be the same as the service provider of the mobile devices 57.

When using a short-range wireless connection (SRWC) protocol (e.g., Bluetooth/Bluetooth Low Energy or Wi-Fi), mobile computing device 57 and telematics unit 30 may pair/link one with another when within a wireless range (e.g., prior to experiencing a disconnection from the wireless network). In order to pair, mobile computing device 57 and telematics unit 30 may act in a BEACON or DISCOVERABLE MODE having a general identification (ID); SRWC pairing is known to skilled artisans. The general identifier (ID) may include, e.g., the device's name, unique identifier (e.g., serial number), class, available services, and other suitable technical information. Mobile computing device 57 and telematics unit 30 may also pair via a non-beacon mode. In these instances, the call center 20 may participate in pairing mobile computing device 57 and telematics unit 30. For example, the call center 20 may initiate the inquiry procedure between the telematics unit 30 and mobile computing device 57. And call center 20 may identify mobile computing device 57 as belonging to the user of vehicle 12 and then receive from the mobile computing device 57 it's unique mobile device identifier and authorize the telematics unit 30 via the wireless communication system 14 to pair with this particular ID.

Once SRWC is established, the devices may be considered bonded as will be appreciated by skilled artisans (i.e., they may recognize one another and/or connect automatically when they are in a predetermined proximity or range of one other. In other words—they may become, at least temporarily, network participants). Call center 20 may also authorize SRWC on an individual basis before completion.

Telematics Controller 52 (processor) can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Telematics Controller 52 executes various types of digitally-stored instructions, such as software or firmware programs stored in memory 54, which enable the telematics unit to provide a wide variety of services. For instance, controller 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services provided in connection with one or more vehicle system modules 42 (VSM) embodied as critical event sensor interface modules such as an emergency reaction module (ERM); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit 30 is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to data center 20 or other remote computer system, such as computer 18, for other purposes, such as fleet management. Also, new or updated map data can be downloaded to the GPS module 40 from the data center 20 via the telematics unit 30.

Apart from the audio system 36 and GPS module 40, the vehicle 12 can include other VSMs 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, VSM 42 can be an emergency reaction module (ERM) that monitors various aspects of vehicle 12 upon encountering a critical event such as, but not limited to, side panel and bumper integrity, airbag deployment, as well as other vehicle diagnostics. According to one embodiment, ERM is equipped with on-board diagnostic (OBD) features that provide myriad real-time data, such as that received from various sensors including vehicle body sensors, and may provide a series of emergency diagnostic codes (EDCs) to allow a live advisor 86 to identify vehicle damage as well as contend a critical event type from data center 20.

Another VSM 42 can be a powertrain control module that regulates operation of one or more components of the vehicle powertrain. As is appreciated by those skilled in the art, the above-mentioned VSMs are only examples of some of the modules that may be used in vehicle 12, as numerous others are also possible. It should be understood a critical event may, for example, be considered to have occurred when a vehicle collides with (or is hit by) at least one other object such as, but not limited to, a vehicle, pedestrian, animal, road debris, or other stationary obstruction (e.g., a tree or utility pole). Critical events may result in emotional distress, physical trauma, injury, death, and/or property damage of one or more event participants and/or bystanders.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art.

The pushbutton(s) 34 allow manual user input into the telematics unit 30 to initiate wireless telephone calls and provide other data, response, or control input. Separate pushbuttons can be used for initiating emergency calls/notifications versus regular service assistance calls to the data center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions (i.e., capable of GUI implementation). For example, upon vehicle 12 encountering a critical event, which may be considered of a certain capacity by ERM 42 and/or live advisor 86, display 38 may exhibit certain third-party contact information such as an allocated emergency phone number. Audio system 36 may also generate at least one audio notification to announce such third-party contact information is being exhibited on display 38 and/or may generate an audio notification which independently announces the third-party contact information. Various other vehicle user interfaces can also be utilized, as the interfaces of FIG. 1 are only an example of one particular implementation.

It should be appreciated that, in order to reach the capacity in which a method and system disclosed herein would be implemented, the critical event should have caused substantial damage (e.g., to vehicle 12), generally believed to be of a nature associated with substantial operator and/or passenger injury. In one example, the deployment of at least one vehicle airbag will be considered a prima facie case of substantial damage. Another example of a prima facie case, may involve the vehicle operator commanding telematics unit 30 via one or more pushbuttons or other control inputs 34 configured to for initiating emergency notifications. Another example of a prima facie case, may involve the operator of mobile computing device 57 commanding the device to initiate an emergency notification (e.g., via interface 59). Such injuries may, for example, have resulted in the operator being mentally incapacitated, have been previously transported from the accident scene (e.g., via ambulance), have been killed, or have otherwise lost their interpersonal communications abilities. It should be understood that other events may be considered critical, especially those events resulting in emotional distress, physical trauma, injury, death, and/or property damage of one or more event participants and/or bystanders.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000 or 1×EV-DO) or GSM/GPRS (e.g., 4G LTE). As will be appreciated by skilled artisans, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to data center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, data center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or data center 20, or both. A computer 18 can also be used for providing Internet connectivity such as DNS services or as a network address server that uses DHCP or other suitable protocol to assign an IP address to the vehicle 12.

Data center 20 is designed to provide the vehicle electronics 28 with a number of different system backend functions and, according to the exemplary embodiment shown here, generally includes one or more switches 80, servers 82, databases 84, live advisors 86, as well as an automated voice response system (VRS) 88, all of which are known in the art. These various data center components are preferably coupled to one another via a wired or wireless local area network 90. Switch 80, which can be a private branch exchange (PBX) switch, routes incoming signals so that voice transmissions are usually sent to either the live adviser 86 by regular phone, backend computer 87, or to the automated voice response system 88 using VoIP. Server 82 can incorporate a data controller 81 which essentially controls the operations of server 82. Controller 81 may control, send, and/or receive data information (e.g., data transmissions) from one or more of the data bases 84 and mobile computing device 57. For example, Controller 81 is capable of reading executable instructions stored in a non-transitory machine readable medium and may include one or more from among a processor, a microprocessor, a central processing unit (CPU), a graphics processor, Application Specific Integrated Circuits (ASICs), Field-Programmable Gate Arrays (FPGAs), state machines, and a combination of hardware, software and firmware components. The live advisor phone can also use VoIP as indicated by the broken line in FIG. 1. VoIP and other data communication through the switch 80 is implemented via a modem (not shown) connected between the switch 80 and network 90.

Data transmissions are passed via the modem to server 82 and/or database 84. Database 84 can store account information such as vehicle dynamics information and other pertinent subscriber information. Data transmissions may also be conducted by wireless systems, such as 802.11x, GPRS, and the like. Although the illustrated embodiment has been described as it would be used in conjunction with a manned data center 20 using live advisor 86, it will be appreciated that the data center can instead utilize VRS 88 as an automated advisor or, a combination of VRS 88 and the live advisor 86 can be used.

Emergency Contact Services During Critical Event

As discussed above, the user of mobile computing device 57 and the vehicle 12 may create at least one emergency contact. The user may perform tasks to create this contact through a variety of devices such as remote computer 18, mobile computing device 57, and display 56. The contact may moreover be created when purchasing vehicle 12 at a dealership (not shown), when purchasing mobile device 57, through live advisor 86 at call center 20, or any other time so desired. The contact may include emergency contact data to enable third parties (e.g., emergency responders) and live advisors 86 to identify and connect with a specific person associated with the emergency contact designation. The emergency data may include, but is not limited to, the contact's name, phone number, address, email address, related names, and social media profile. The emergency data may also be previously stored contact information transformed into emergency data through the implementation of designation data added to the stored contact data (e.g., language such as "I.C.E.", "ICE", or "Emergency Contact" or a symbol).

The mobile computing device 57 may receive the emergency contact, for example, by the user providing the emergency data via interface 59. The mobile computing device 57 may moreover store the emergency contact data in memory 61. The emergency data may be validated by the call center 20 to ensure authenticity and/or validity. For example, data center 20 may access one or more additional remote servers and/or remote databases (e.g., social media sites such as FACEBOOK™ or LINKEDIN™) to receive information in support of the emergency data. In order to authenticate the mobile device, mobile device 57 may directly transmit this data cellularly to the call center 20 or indirectly transmit the data through telematics unit 30 (e.g., when devices are connected via SRWC).

Call center 20 may require verification of the emergency contact data by sending a confirmation message to telematics unit 30 (to be completed by the user). After telematics unit 30 receives the verification message, it may transmit a response message back to call center 20. The response message may include a response to the verification (e.g., yes/no). In some instances, this transmission is performed securely using one or more known encryption methodologies. The call center 20 may periodically require verification the data to confirm that the emergency data remains to be associated with the proper contact.

When an SRWC is established between mobile device 57 and telematics unit 30, as discussed above, the emergency contact data may be transmitted and stored in digital memory device 54. Such storage may, for example, occur automatically, after an allowance from the user, or upon the data being transmitted to data center 20. In addition, the emergency contact data may be stored in database 84 and accessible on server 82 (i.e., cloud storage based data). It should be appreciated the emergency contact data may be stored in a third-party remote database (i.e., computer 18) accessible by telematics unit 30 (i.e., cloud storage based data).

Method

Figure 2:
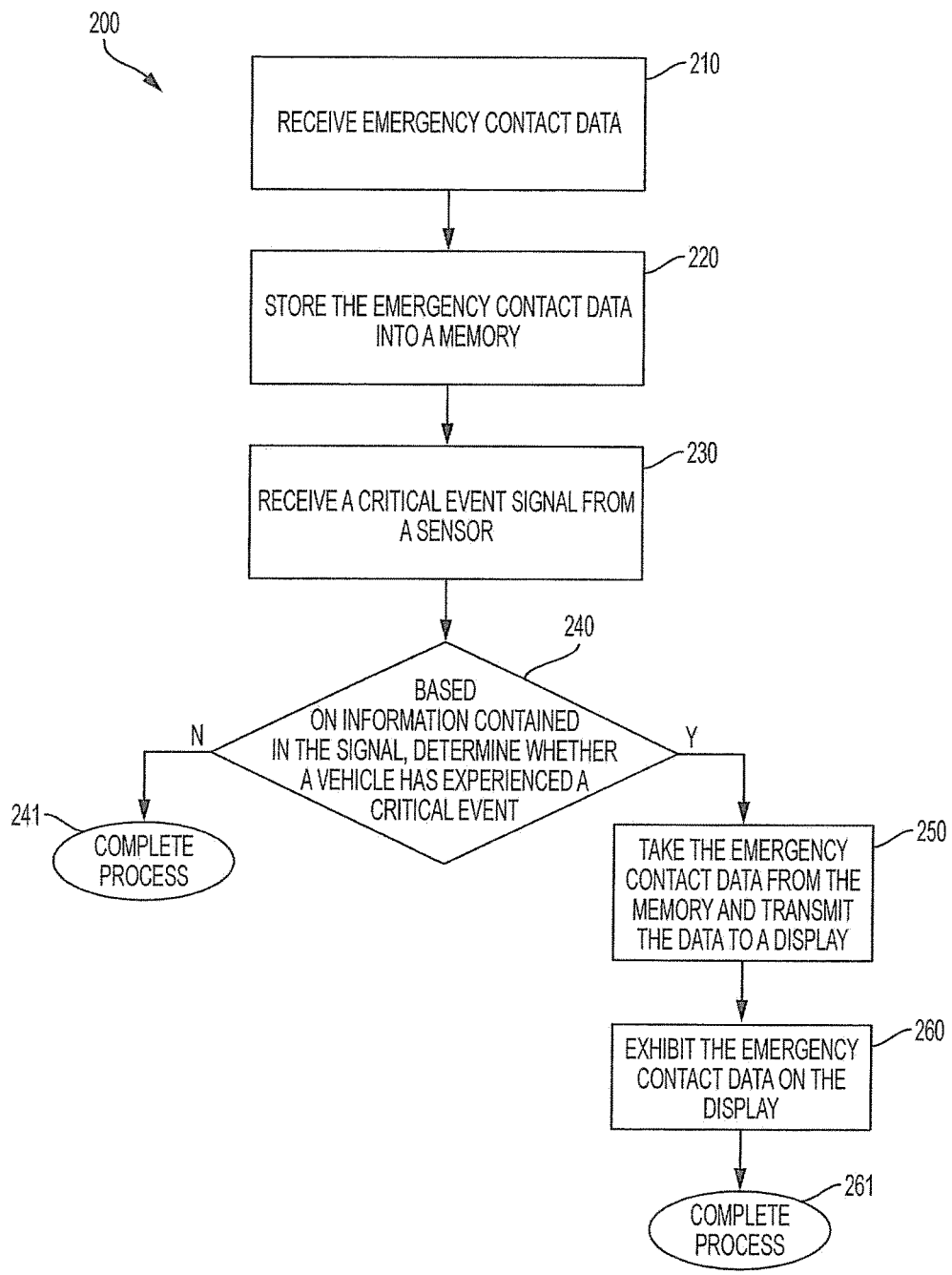
FIG. 2 is a flowchart depicting one exemplary embodiment of the method.

Turning to FIG. 2, there is shown an embodiment of a method 200 to access an emergency contact during a critical event. One or more aspects of method 200 may be completed through the implementation of controller 52 which may include one or more executable instructions incorporated into memory 54 and executed by of telematics unit 30 and antenna 56. One or more aspects of method 300 may also, for example, be implemented by server 82 of data center 20 which may include one or more executable instructions incorporated into data base 81. One or more aspects of method 200 may further, for example, be implemented by a device that executes instructions to enable the computer processing capability of mobile device 57, which may include one or more executable instructions incorporated into database 61.

The method 200 is supported by telematics unit 30 being configured to establish an SWRC with at least one mobile device 57. This configuration may be made by a vehicle manufacturer at or near the time of the telematics unit's assembly or after-market (e.g., via vehicle download using the afore-described communication system 10 or at a time of vehicle service, just to name a couple of examples). In at least one implementation, one or more instructions are provided to at least one of the mobile device processor, electronic processing device 52, and server 82 and stored on non-transitory computer-readable medium (e.g., on databases 61, 54, and 84). Method 200 is further supported by preconfiguring mobile computing device 57, telematics unit 30, and call center 20 with the ability to store emergency contact data in database(s) 61, 54, and 84, respectively, and accessible by mobile device processor, electronic processing device 52, and server 82, respectively. Method 200 is further yet supported by preconfiguring mobile computing device 57 and telematics unit 30 with the ability to exhibit emergency contact data via user interface 59 and telematics display 38, respectively.

The method begins with step 210 which includes a controller receiving emergency contact data. As discussed above, the controller may be located in mobile computing device 57, telematics unit 30, and/or data center 20. As examples, the controller may be one or more devices that execute instructions to enable the computer processing capability of mobile device 57. As such, a user would submit the emergency contact data to mobile device 57 via user interface 59.

The controller may also be the electronic processing device 52 that executes the instructions to enable the computer processing capability of telematics unit 30. For instance, the emergency contact information may be transmitted to telematics unit 30 by mobile computing device 57 via established SRWC (discussed above). It should be appreciated that the data may be transmitted immediately upon a critical event occurrence or it may be transmitted sometime prior to a critical event (i.e., so as to be on-hand and ready for download upon such an event occurrence). The controller may further be server 82 that executes the instructions to enable the backend functions of data center 20. It should be appreciated that the emergency data may include, but is not limited to, the contact's name, phone number, address, email address, related names, and social media profile.

Step 220 includes the controller storing the emergency contact data into a memory. As discussed above, the memory may the databases 61, 54, and 84, which are located in mobile computing device 57, telematics unit 30, and/or data center 20, respectively. Step 230 includes the controller receiving a critical event signal from a sensor. It should be appreciated that the sensor may be the vehicle emergency reaction module (ERM), or at least a component thereof.

Step 240 includes the controller making a determination on whether vehicle 12 has experienced a critical event. In this step, the controller will base the determination from an analysis of the information contained in the signal. If the controller recognizes that the signal contains information sufficient to reach the capacity in which a critical event has occurred, method 200 may then move directly to step 250. If controller otherwise recognizes that such determination is in the negative, method 200 will move to completion 241. As discussed above, in order to reach the capacity in which a critical event has actually occurred, the vehicle should have incurred damage generally believed to be of a nature associated with substantial operator and/or passenger and/or bystander injury. This may, for example, be the deployment of at least one vehicle airbag. Live advisor 86 may also be instructed to attempt to make contact with the vehicle operator in support of the determination made in step 240.

Step 250 includes the controller taking the emergency contact data from the memory and transmitting the data to, for example, display 38. To support this functionality, or as an independent function in and of itself, the controller may also take the emergency contact data from the memory and transmit the data to user interface 59. In those instances when the controller and memory are located in data center 20, the emergency contact may be transmitted via wireless carrier system 14. In those instances, otherwise, when the controller and memory are located in mobile computing device 57, the emergency contact may be transmitted via the SRWC (or directly via the internal mobile device 57 circuitry to user interface 59, or both via SRWC and the internal circuitry). In certain instances, step 250 may moreover include the controller taking the emergency contact data from the memory and transmitting the data via SRWC to audio system 36.

Step 260 includes the display exhibiting the emergency contact. To this effect, it should be appreciated that either telematics display 38 or user interface 59 may exhibit the emergency contact data; alternatively, both telematics display 38 and user interface 59 may simultaneously exhibit the emergency contact data. Such exhibition allows third parties such as, for example, first responders to view the emergency contact data. This service can be advantageous in certain situations subsequent to a critical event such as, for example, the vehicle operator being mentally incapacitated, the operator having been previously transported from the accident scene (e.g., by ambulance), the operator having been killed during the critical event, or the vehicle operator having somehow otherwise lost their interpersonal communications abilities. It should be appreciated that the emergency contact exhibition (by either/both display 38 and user interface 59) may include aesthetic stimuli such as, but not limited to, icons and colors, which may improve the likelihood of the exhibition being viewed by the third parties. In certain instances, step 260 may moreover include audio system 36 generating at least one audio notification of the emergency contact data (e.g., repeating an audio alarm stating the name and telephone number associated with the emergency contact). Upon completion of step 260, method 200 will move to completion 261.

Figure 3:
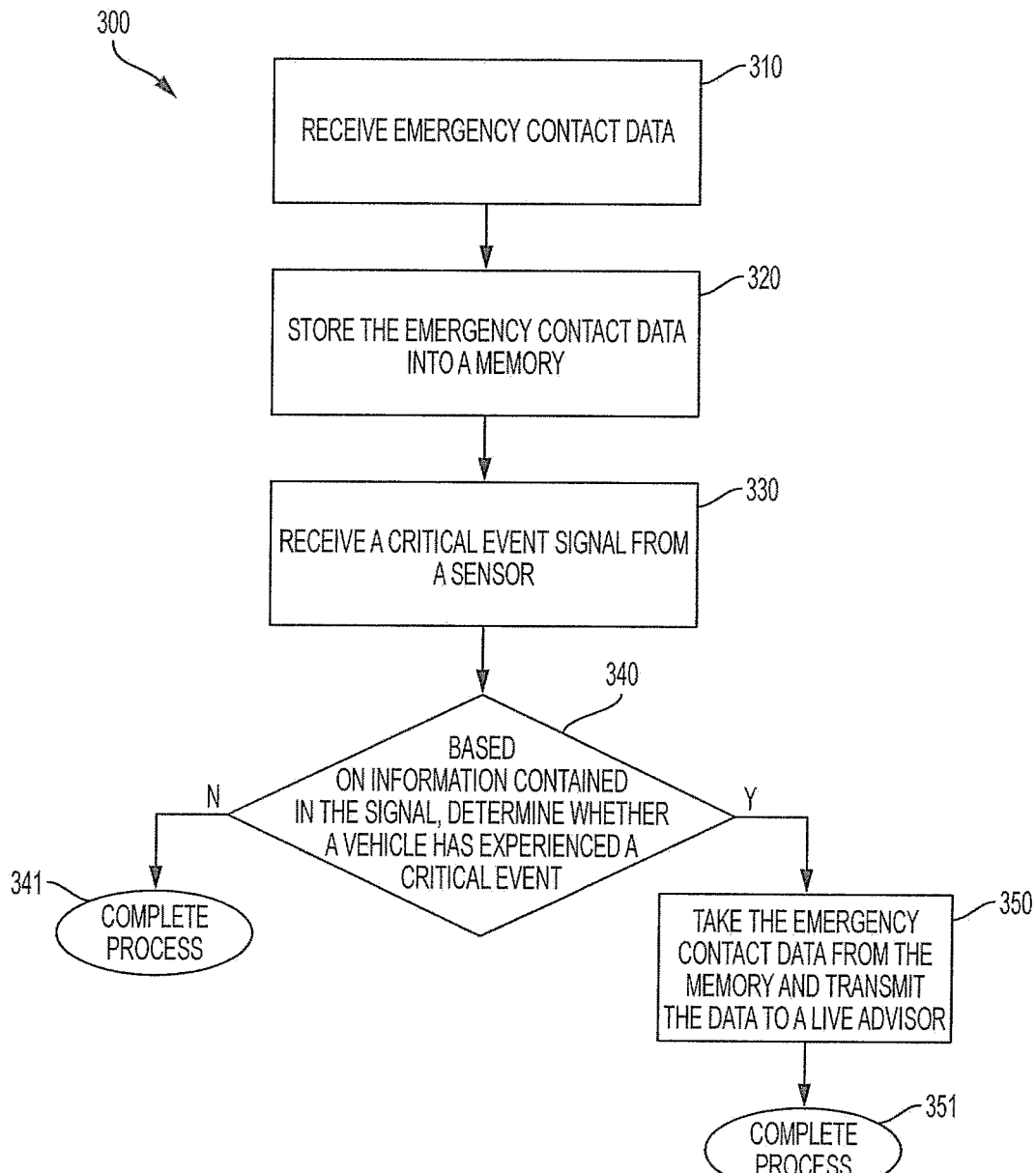
FIG. 3 is a flowchart depicting another exemplary embodiment of the method.

Now turning to FIG. 3, there is shown an embodiment of a method 300 to access an emergency contact during a critical event. One or more aspects of method 300 may be completed through the implementation of controller 52 which may include one or more executable instructions incorporated into memory 54 and executed by of telematics unit 30 and antenna 56. One or more aspects of method 300 may also, for example, be implemented by server 82 of data center 20 which may include one or more executable instructions incorporated into data base 81. One or more aspects of method 300 may further, for example, be implemented by a device that executes instructions to enable the computer processing capability of mobile device 57, which may include one or more executable instructions incorporated into database 61.

The method is supported by telematics unit 30 being configured to establish an SWRC with at least one mobile device 57. This configuration may be made by a vehicle manufacturer at or near the time of the telematics unit's assembly or after-market (e.g., via vehicle download using the afore-described communication system 10 or at a time of vehicle service, just to name a couple of examples). In at least one implementation, one or more instructions are provided to at least one of the mobile device processor, electronic processing device 52, and server 82 and stored on non-transitory computer-readable medium (e.g., on databases 61, 54, and 84). The method is further supported by preconfiguring mobile computing device 57, telematics unit 30, and call center 20 with the ability to store emergency contact data in database(s) 61, 54, and 84, respectively, and accessible by mobile device processor, electronic processing device 52, and server 82, respectively.

The method begins with step 310 which includes a controller receiving emergency contact data. As discussed above, the controller may be located in mobile computing device 57, telematics unit 30, and/or data center 20. As examples, the controller may be one or more devices that execute instructions to enable the computer processing capability of mobile device 57. As such, a user would submit the emergency contact data to mobile device 57 through user interface 59.

The controller may also be the electronic processing device 52 that executes the instructions to enable the computer processing capability of telematics unit 30. For instance, the emergency contact information may be transmitted to telematics unit 30 by mobile computing device 57 via established SRWC (discussed above). It should be appreciated that the data may be transmitted immediately upon a critical event occurrence or it may be transmitted sometime prior to a critical event (i.e., so as to be on-hand and ready for download upon such an event occurrence). The controller may further be server 82 that executes the instructions to enable the backend functions of data center 20. It should be appreciated that the emergency data may include, but is not limited to, the contact's name, phone number, address, email address, related names, and social media profile.

Step 320 includes the controller storing the emergency contact data into a memory. As discussed above, the memory may be the databases 61, 54, and 84, which are located in mobile computing device 57, telematics unit 30, and/or data center 20, respectively. Step 330 includes the controller receiving a critical event signal from a sensor. It should be appreciated that the sensor may be the vehicle emergency reaction module (ERM), or at least a component thereof.

Step 340 includes the controller making a determination on whether vehicle 12 has experienced a critical event. In this step, the controller will base the determination from an analysis of the information contained in the signal. If the controller recognizes that the signal contains information sufficient to reach the capacity in which a critical event has occurred, method 300 may then move directly to step 350. If controller otherwise recognizes that such determination is in the negative, method 300 will move to completion 341. As discussed above, in order to reach the capacity in which a critical event has actually occurred, the vehicle should have incurred damage generally believed to be of a nature associated with substantial operator and/or passenger and/or bystander injury. This may, for example, be the deployment of at least one vehicle airbag. Live advisor 86 may also be instructed to attempt to make contact with the vehicle operator in support of the determination made in step 340.

Step 350 includes the controller taking the emergency contact data from the memory and transmitting the data to live advisor 86. As such, live advisor 87 may review the emergency contact data on the screen of their backend computer 87 and subsequently attempt to make contact with the emergency contact disclosed through the data. In those instances when the controller and memory are located in data center 20, the emergency contact may be transmitted via local area network 90. In those instances, otherwise, when the controller and memory are located in mobile computing device 57, the emergency contact may be transmitted via the SRWC. Upon completion of step 350, method 300 will move to completion 351. It should be appreciated, to support live advisor 86, display 38 and/or user interface 59 may also exhibit the emergency contact data.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components. Such example devices may be on-board as part of a vehicle computing system or be located off-board and conduct remote communication with devices on one or more vehicles.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method to access an emergency contact during a critical event, the method comprising:
   (a) receiving, at a controller located in a data center, an emergency contact;
   (b) storing, via the controller, the emergency contact in a memory located in the data center;

(c) receiving, via the controller, a critical event signal from a sensor located in a vehicle;
(d) determining, via the controller, whether a critical event has occurred based on the signal;
(e) based on (d), transmitting through a wireless carrier system, via the controller, the emergency contact from the memory to a display located in the vehicle; and
(f) exhibiting, via the display, the emergency contact.

2. The method of claim 1, further comprising:
(g) based on (d), transmitting, via the controller, the emergency contact to an audio system; and
(h) generating, via the audio system, at least one audio notification associated with the emergency contact.

3. The method of claim 1, wherein the sensor is at least part of a vehicle emergency reaction module (ERM).

4. A system to access an emergency contact during a critical event, the system comprising:
a memory located in a data center, the memory comprising one or more executable instructions;
a controller located in the data center, the controller configured to read and execute the one or more executable instructions;
a display located in a vehicle, the display configured to exhibit information;
a sensor located in the vehicle configured to send at least one critical event signal; and
wherein the executable instructions enable the controller to:
(a) receive an emergency contact;
(b) store the emergency contact in the memory;
(c) receive, from the sensor, a critical event signal;
(d) determine the status of a critical event;
(e) transmit through a wireless carrier system the emergency contact from the memory to the display; and
(f) command the display to exhibit the emergency contact.

5. The system of claim 4, further comprising:
an audio system configured to provide audio output within a vehicle cabin area;
wherein the executable instructions further enable the controller to:
(g) transmit the emergency contact from the memory to the audio system; and
(h) generate at least one audio notification associated with the emergency contact.

6. The system of claim 4, wherein the sensor is at least part of a vehicle emergency reaction module (ERM).

7. The method of claim 1, wherein the emergency contact exhibit includes aesthetic stimuli.

8. The system of claim 4, wherein the emergency contact exhibit includes aesthetic stimuli.

* * * * *